United States Patent [19]

Myers

[11] 4,330,045
[45] May 18, 1982

[54] VEHICLE WHEEL MECHANISM

[75] Inventor: Walter I. Myers, 7629 E. 21 St., Apt. 205, Tulsa, Okla. 74112

[73] Assignee: Reliance Electric Company, Cleveland, Ohio

[21] Appl. No.: 75,798

[22] Filed: Sep. 14, 1979

[51] Int. Cl.³ .............................................. B60K 1/00
[52] U.S. Cl. .................................. 180/65 F; 74/764; 188/18 A; 301/6 E
[58] Field of Search .................. 180/65 F; 188/18 A, 188/71.1, 73.3; 301/6 A, 6 D, 6 E, 6 CS; 74/764, 765

[56] References Cited

U.S. PATENT DOCUMENTS

| | | | |
|---|---|---|---|
| 2,258,328 | 10/1941 | Lee et al. | 180/42 |
| 2,899,005 | 8/1959 | Speicher | 180/60 |
| 3,055,448 | 9/1962 | Fagel | 180/10 |
| 3,090,456 | 5/1963 | Blenkle | 180/10 |
| 3,586,132 | 6/1971 | Tantlinger | 188/18 A |
| 3,812,928 | 5/1974 | Rockwell et al. | 180/65 F |
| 3,812,928 | 5/1974 | Rockwell et al. | 180/65 F |
| 3,897,843 | 8/1975 | Hapeman et al. | 180/65 F |
| 3,969,950 | 7/1976 | Rau et al. | 180/65 F X |
| 4,010,830 | 3/1977 | Logus et al. | 188/18 A X |

FOREIGN PATENT DOCUMENTS 247220 9/1963 Australia ............................ 180/65 F
79251 10/1962 France ............................... 180/65 F Primary Examiner—Joseph F. Peters, Jr.
Assistant Examiner—Donald W. Underwood
Attorney, Agent, or Firm—Pearne, Gordon, Sessions, McCoy & Granger

[57] ABSTRACT

A wheel mechanism is disclosed for a vehicle which has a wheel support, such as an axle, in which an electric motor is housed having a drive shaft within a hub. A wheel is journaled on bearings around the hub and an axially outboard wall cooperates with the hub to form a gear case. Within the gear case, first and second planetary gear sets are connected to drive the wheel from the motor drive shaft. The axially outboard wall on the gear case is nonrotating and supports brake calipers to cooperate with a disc brake secured to the wheel. A modular construction of the entire wheel mechanism is provided, with the brake being outboard for easy servicing of brake pads and the planetary gear sets being next outboard for any service or gear ratio change required. The foregoing abstract is merely a resume of one general application, is not a complete discussion of all principles of operation or applications, and is not to be construed as a limitation on the scope of the claimed subject matter.

15 Claims, 2 Drawing Figures

VEHICLE WHEEL MECHANISM

BACKGROUND OF THE INVENTION

Gear reduction wheel mechanisms have been made in a variety of structures. One form of vehicle wheel mechanism, as in U.S. Pat. No. 2,899,055, provides an electric motor disposed within the wheel and then a compound gear set inboard of the electric motor and connected to drive the wheel. With large wheels for earth moving equipment wherein the wheel may weigh several tons, it becomes extremely time-consuming to service the gear reduction mechanisms because the wheels and tires must be removed, the electric motor removed, and finally the gear set is made available.

Some such wheel mechanisms have been provided with a motor inboard and a gear mechanism outboard generally within the plane of the wheel. The typical construction of such wheel mechanism, as in U.S. Pat. No. 3,055,448, is one wherein the axially outboard gear case wall is rotating and rotates with the last stage planet carrier of a planetary gear set. In recent years, safety has been of greater concern, including the ability to stop large trucks which might be 100 to 300 tons load carrying capacity. The typical braking for such trucks is dynamic retarding, with the electric motor acting as a generator to generate electrical power which is dissipated in resistor grids. On long downgrades, however, the resistor grids may overheat and some friction brake mechanism is highly desirable and is becoming mandatory in some locations. Also, it is necessary to use friction brakes to bring the vehicle to a dead stop, since some considerable forward speed is required to create a retarding force using dynamic braking. Disc brakes have been used on such wheel mechanisms, but in many cases they are motor speed brakes as distinguished from wheel speed brakes. This is the type shown in U.S. Pat. No. 3,897,843.

Another construction, such as in U.S. Pat. No. 2,258,328, is one wherein the brake is between the motor and the gears, but this has the deficiency of needing to take the wheel and tire off to service the brake. Where the wheels are large units, for example where one entire wheel mechanism might weigh 6 tons for a vehicle having a load hauling capacity of 150 tons, it might take as much as an eight-hour shift for men with proper equipment to take a wheel apart for servicing of the internal brake.

Another type of motorized wheel achieved a nonrotating axially outboard gear case wall together with a planetary gear final drive. This is the type shown in U.S. Pat. No. 3,090,456. However, in such construction, the output from the final planetary gear was from the planet carrier and such output was inwardly to a small diameter sleeve, then axially outwardly, and then radially outwardly to the wheel. Accordingly, in such construction, there was no nonrotating gear case wall which was radially inboard of the output to the wheel.

Still another construction of wheel mechanism, as in U.S. Pat. No. 3,812,928, was one wherein the gear case outer wall was stationary, and there was a planetary final drive to the wheel; however, this required an inside-out motor with a stationary shaft which was large in diameter in order to be able to carry the weight of the vehicle on such long cantilevered, fixed shaft.

The deficiencies of the prior art construction then brought about the question of how to achieve a wheel speed brake which was axially outboard of all of the rest of the mechanisms in a vehicle wheel mechanism and with the planetary gear mechanism next available, immediately inboard of the brake.

SUMMARY OF THE INVENTION

This problem is solved by a vehicle wheel mechanism for a vehicle having a wheel support, comprising in combination, a nonrotating wheel hub connected to the wheel support, a rotatable drive shaft in said hub, a wheel, bearing means journaling said wheel on said hub, a planetary gear set mounted in said hub and having an input and an output, drive means operably connecting said input to said drive shaft, means connecting said output to said wheel for drive thereof, a nonrotating, axially outboard wall defining with said hub a part of a gear case for said gear set, a rotatable first brake part secured to said wheel outboard of said gear case outboard wall, and a nonrotatable second brake part secured to said gear case outboard wall and acting on said first brake part.

An object of the invention is to provide a vehicle wheel mechanism with the motor inboard, a two-stage planetary gear set outboard thereof, and a wheel speed brake outboard of the gear case.

Another object of the invention is to provide a wheel mechanism wherein a planetary gear set is provided in a gear case which has a nonrotating outer wall carrying a brake mechanism for the wheel.

Another object of the invention is to provide a wheel mechanism which is of modular construction for easy removal of the brake, gear, and motor components.

Still another object of the invention is to provide a vehicle wheel mechanism wherein the drive from the motor to the wheel may be easily disconnected for towing of the vehicle.

BRIEF DESCRIPTION OF THE DRAWING

Other objects and a fuller understanding of the invention may be had by referring to the following description and claims, taken in conjunction with the accompanying drawing.

DESCRIPTION OF THE PREFERRED EMBODIMENTS

Figure 1:
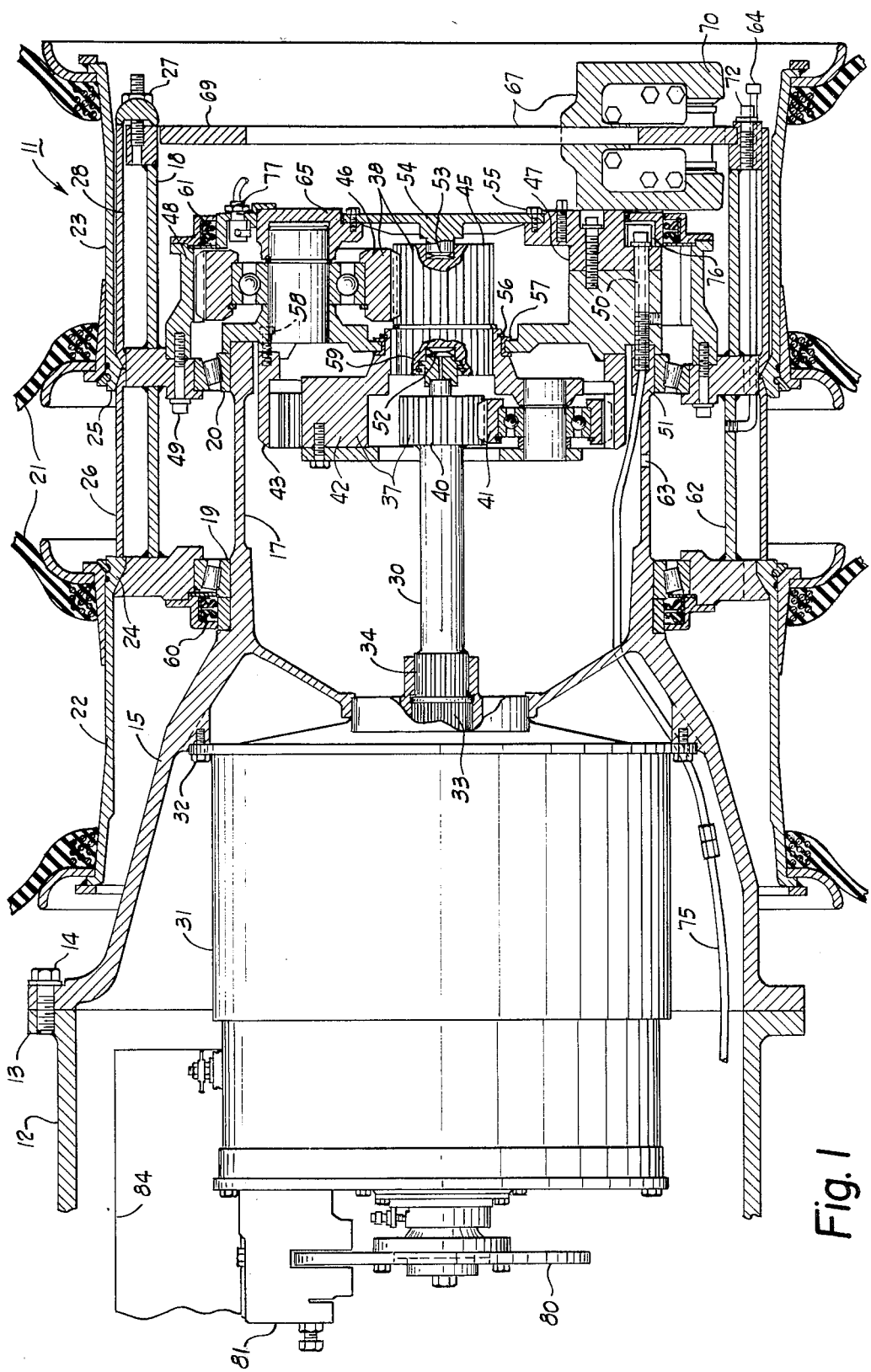
FIG. 1 is a longitudinal, sectional view of a wheel mechanism embodying the invention.
Figure 2:
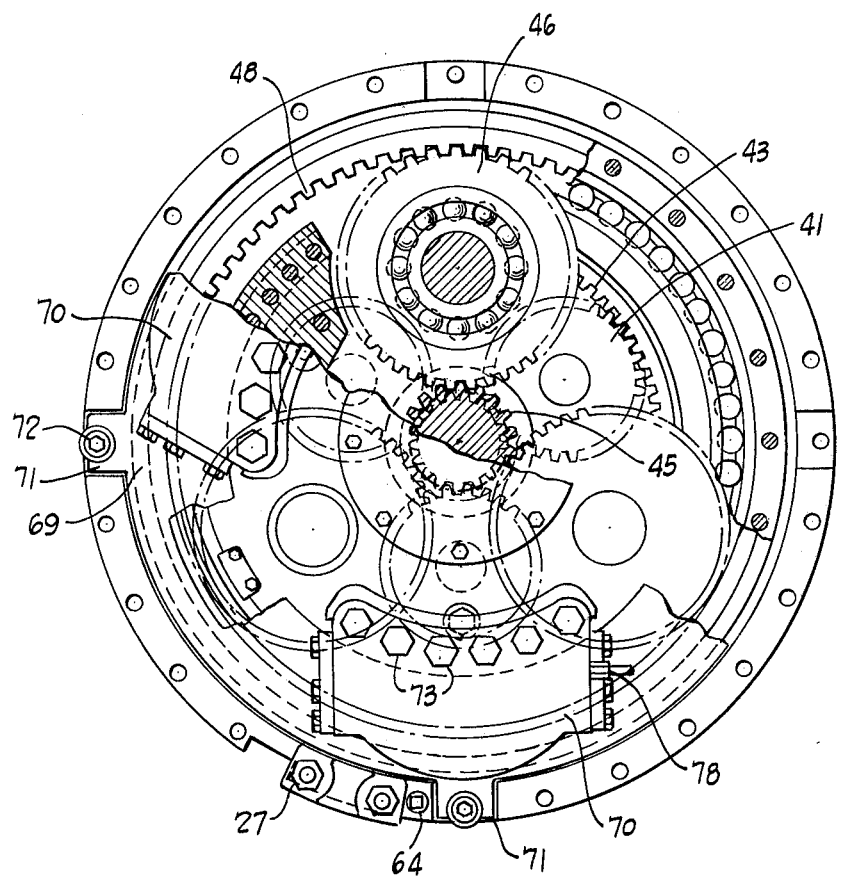
FIG. 2 is an end view, partially in section, of the mechanism of FIG. 1.

The drawing illustrates a vehicle wheel mechanism 11 for use with a vehicle (not shown) but which has a wheel support 12, such as a hollow axle having a flange 13. Bolted to this flange, as by bolts 14, is a hub 15 of cast steel, for example. The wheel hub may be a steerable wheel hub, but in this case is shown as nonsteerable and, in any case, would be a nonrotating wheel hub. This hub is shown slightly conical in shape to be reduced in cross sectional area as the outboard end thereof is approached, with the outboard end being at the right side of FIG. 1. A gear case 17 may be considered an extension of the hub 15, and is secured thereto as by welding. A wheel 18 is journaled by inboard and outboard bearings 19 and 20 to the hub 15. This wheel 18 carries some ground-engaging structure, in this case shown as dual rubber tires 21 mounted on inboard and outboard rims 22 and 23. The rim 22 is secured to the wheel 18 at the driving connection 24 and the rim 23 is secured to the wheel at the driving connection 25, with a spacer 26 locating the rims on the wheel 18. Nuts 27 and spacers 28 secure the rims on the wheel.

A rotatable drive shaft 30 is provided in the hub 15, and this drive shaft may come from a differential mechanism which drives two wheels on opposite ends of the axle 12 from a single prime mover, as is common in smaller truck constructions. Alternatively, and as shown herein, the drive shaft 13 may be driven by an electric motor 31. In such construction, there is a separate electric motor for each wheel mechanism. The motor 31 is detachably secured to the hub 15 by bolts 32, and is mounted partly within the hub 15 and partly within the axle 12. The motor has a motor shaft 33 and the drive shaft 30 has a splined connection 34 therewith to permit slight lateral adjustment movements of the outboard end of this drive shaft 30.

The gear case 17 contains a gear reduction to drive the wheel 18 at a speed less than that of the drive shaft 30. In the preferred embodiment, this gear reduction includes double reduction gearing, and also the preferred embodiment includes at least one planetary gear set. As shown, the gear reduction includes a first, or high-speed, planetary gear set 37 and a second, or low-speed, planetary gear set 38. The first planetary gear set includes a sun gear 40, one or more planet gears 41 in a planet carrier 42, and a ring gear 43. The sun gear 40 is rotationally fixed on the drive shaft 30 and meshes with the planet gears 41, with the planet carrier 42 being rotatable on the fixed ring gear 43. The second planetary gear set 38 includes a sun gear 45, one or more planet gears 46 in a planet carrier 47, and a ring gear 48. The ring gear 48 is fixed by bolts 49 to the wheel 18, so that this forms the rotatable output of the second planetary gear set 38. The second planet carrier 47 is secured by bolts 50 to a ring 51, which is welded to and forms part of the gear case 17. Accordingly, this planet carrier 47 is nonrotating, i.e., stationary, in this application. The sun gear 45 is not journaled on any bearing, but is centered laterally by its sharing of torque reaction with the plurality of planet gears 46. The sun gear 45 is centered axially by thrust members, shown as Belleville washers 52, acting between it and the drive shaft 30, and Belleville washers 53 acting between the sun gear 45 and a cover plate 54. This cover plate is secured by screws 55. The inboard end of the sun gear 45 has a splined connection at 59 to be driven from the first planet carrier 42. The lateral centering of the sun gear 45 by the torque reaction is that which laterally centers the planet carrier 42, in combination with the engagement of the first planet gears 41 with the ring gear 43. The first planet carrier 42 is axially centered by a split ring 56 and thrust bearing washers 57 coacting with the second planet carrier 47. Bolts 58 secure the ring gear 43 to the fixed planet carrier 47.

A first rotary seal 60 is positioned immediately inboard of the inboard bearing 19, and a second rotary seal 61 is positioned immediately outboard of the second ring gear 48. These rotary seals contain the lubricating oil within the gear case 17 to provide lubrication for all of the gears and the bearings 19 and 20. The lubricating oil is further contained within this gear case 17 by a ring member 62, which is secured to and rotates with the wheel 18. This is radially outboard of the bearings 19 and 20, so that these bearings are bathed in the lubricating oil. Oil may pass through the gear case wall 17 at an aperture 63, and be drained at an oil drain 64.

A feature of the present invention is that the gear case 17 has a stationary, i.e., nonrotating, outer wall 65 which is the axially outboard end of the cantilevered gear case 17. This outer wall 65 is nonrotating and, more specifically, has a part thereof radially inboard of the last gear stage output which is nonrotating. In this embodiment, since the gear case outer wall 65 and the planet carrier 47 are both nonrotating, they are shown as being unitary, to save material, weight, and space. A brake mechanism 67 has first and second parts 69 and 70, which are relatively rotatable and coact with each other. In the preferred embodiment shown, the first brake part is an annular ring-shaped brake disc 69 secured to the wheel 18 by radial extensions 71 and bolts 72. The second brake part is nonrotatable and is secured to the gear case outboard wall 65, as by bolts 73. This second brake part includes one or more brake calipers 70 which extend around the inner circumference of the ring-shaped brake disc 69.

A brake line 75 passes inside the nonrotating hub 15 and passes through one of the bolts 50, which is hollow, to an annular chamber 76. From here it passes through one or more fittings 77 to be outside the stationary wall 65 and passes to the one or more brake calipers 70, for example at the fitting 78. This will provide fluid pressure to actuate the brakes.

A brake disc 80 and brake caliper 81 may optionally be provided on the inboard end of the motor 31 as a motor speed brake, as distinguished from the wheel speed brake. Such brake 80, 81 may be utilized as a parking brake which is spring-engaged and hydraulic pressure-disengaged.

OPERATION

The motor 31 would be operated at variable speeds, for example up to 1800 r.p.m., and with a gear reduction of 25:1 or 30:1, and with tires 21 of 10 to 13 feet in diameter, this could provide a vehicle speed of up to 30 m.p.h. With vehicles having a load capacity from 100 to 300 tons, considerable heat is dissipated in the brake mechanism 67 when used to attempt to stop such a loaded vehicle. The brake pads in the calipers 70 accordingly are subjected to considerable wear, and the present invention provides such brake mechanisms 67 outboard of the stationary gear case wall 65 so that they are readily accessible. The motor 31 may be serviced through an access hole 84 in the axle 12, which also provides access to the parking brake 80,81.

The construction of the wheel mechanism 11 is a modular construction, permitting easy manufacture and servicing. The entire wheel mechanism 11 may be removed at the bolts 14. The entire motor 31 may be removed at the bolts 32. The bolts 72 permit ready removal of the brake disc 69 and the calipers 70 may be removed at the bolts 73. This provides access to the gear case 17. The bolts 50 permit removal of the first and second planetary gear sets 37 and 38 as a unit, except for the second ring gear 48. This permits changing of gear ratios in either the first or second planetary gear set, for example where the truck is going to be used in a new location with a steeper grade to climb. If the vehicle becomes disabled and needs to be towed, the cover plate 54 may be removed and the second stage sun gear 45 simply pulled out, with disconnection at the spline 59. This disconnects the drive between the motor and the wheel so that the vehicle may be towed, and the oil level in the gear case 17 need not be lowered to permit this disconnection of the drive.

Many of the prior art constructions utilized one wherein a planetary gear set had the output thereof from the planet carrier. In practically all cases, this meant that the planet carrier, being rotatable and driving the wheel, established an outer gear case wall which was rotating. As such, it precluded mounting any brake mechanism on such rotating outer gear wall. The present invention, however, utilizes a planetary gear set just inboard of the outer wall 65 and yet this outer wall 65 is nonrotating. This is provided by having the output from the second stage ring gear 48 drive the wheel 18. The seals 60 and 61 are outboard of the bearings 19 and 20, so that these bearings are lubricated by the lubricating oil within the gear case and the seals prevent loss of oil from such gear case. It will be noted that the output to the wheel from the second planetary gear set is at a large diameter, namely the diameter of the second ring gear 48. Accordingly, the outboard wall 65 of the gear case has a nonrotating portion disposed radially inwardly from the output of this planetary gear set. This is the feature which permits mounting the brake calipers on this portion of the nonrotating outer wall 65.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. A vehicle wheel mechanism for a vehicle having a wheel support, comprising in combination,
   a nonrotating wheel hub connected to the wheel support,
   a hollow gear case connected to said hub,
   a nonrotating, axially outboard wall defining with said hub a part of said gear case,
   a rotatable drive shaft in said gear case,
   a wheel,
   bearing means journaling said wheel on said hub,
   a planetary gear set mounted in said gear case and having an input and an output,
   drive means operably connecting said input to said drive shaft,
   means connecting said output to said wheel for drive thereof,
   a rotatable first brake part secured to said wheel outboard of said gear case outboard wall, and
   a nonrotatable second brake part secured to said gear case outboard wall at a location remote from the axis of the wheel and acting on said first brake part.

2. A wheel mechanism as set forth in claim 1, wherein said outboard wall of said gear case has a portion disposed radially inwardly of said output of said planetary gear set.

3. A wheel mechanism as set forth in claim 2, wherein said second brake part is mounted on said radially inwardly disposed portion of said gear case wall.

4. A wheel mechanism as set forth in claim 1, wherein said planetary gear set is a low speed gear set, and said drive means includes a high speed gear set.

5. A wheel mechanism as set forth in claim 4, wherein said high speed gear set is a planetary gear set.

6. A wheel mechanism as set forth in claim 1, wherein said planetary gear set includes a ring gear and a planet carrier having planet gears, and said output being from one of said ring gear and said planet carrier.

7. A wheel mechanism as set forth in claim 6, wherein said output is from said ring gear.

8. A wheel mechanism as set forth in claim 1, wherein said first brake part is a brake disc.

9. A wheel mechanism as set forth in claim 1, wherein said first brake part is an annular ring, and said second brake part is a brake caliper disposed around the inner circumference of said annular ring.

10. A wheel mechanism as set forth in claim 1, including an electric motor carried in said wheel hub and connected to drive said drive shaft.

11. A wheel mechanism as set forth in claim 10, wherein said electric motor is positioned axially inboard of said gear set.

12. A wheel mechanism as set forth in claim 11, wherein said drive means includes a high speed gear set positioned between said first-mentioned gear set and said motor.

13. A wheel mechanism as set forth in claim 1, including a fluid brake line within said hub and gear case, and means connecting said brake line to said second brake part to provide actuation thereof.

14. A vehicle wheel mechanism for a vehicle having a wheel support comprising in combination:
   a nonrotating wheel hub connected to the wheel support,
   a rotatable drive shaft in said hub,
   a wheel,
   bearing means journaling said wheel on said hub,
   a planetary gear set having a planet carrier, an input and an output, said planet carrier being mounted to said hub,
   drive means operably connecting said input to said drive shaft,
   means connecting said output to said wheel for drive thereof,
   said planet carrier including a nonrotating, axial outboard wall defining with said hub a part of a gear case for said gear set,
   a rotatable first brake part secured to said wheel outboard of said gear case outboard wall, and
   a nonrotatable second brake part secured to said planet carrier at a location remote from the central axis of the wheel and acting on said first brake part.

15. A vehicle wheel mechanism for a vehicle having a wheel support, comprising in combination:
   a nonrotating wheel hub connected to the wheel support,
   a hollow gear case connected to said hub,
   a nonrotating, axially outboard wall defining with said hub a part of said gear case,
   a rotatable drive shaft in said gear case,
   a wheel,
   bearing means journaling said wheel on said hub,
   a planetary gear set mounted in said gear case and having an input and an output,
   drive means operably connecting said input to said drive shaft,
   means connecting said output to said wheel for drive thereof,
   said planetary gear set being a low speed gear set,
   said drive means including a high speed gear set,
   a rotatable first brake part secured to said wheel outboard of said gear case outboard wall, and
   a nonrotatable second brake part secured to said gear case outboard wall at a location remote from the axis of the wheel and acting on said first brake part.

* * * * *